United States Patent

[11] 3,626,320

[72] Inventors Richard L. Garwin
Scarsdale;
Robert V. Pole, Yorktown Heights, both of N.Y.
[21] Appl. No. 78,194
[22] Filed Oct. 5, 1970
[45] Patented Dec. 7, 1971
[73] Assignee International Business Machines Corporation
Armonk, N.Y.
Continuation of application Ser. No. 668,558, Sept. 18, 1967, now abandoned.
This application Oct. 5, 1970, Ser. No. 78,194

[54] IMAGE DISPLAY APPARATUS
3 Claims, 2 Drawing Figs.

[52] U.S. Cl. .................................................. 331/94.5, 350/160
[51] Int. Cl. ................................................... H01s 3/05, G02f 1/28
[50] Field of Search ........................................ 350/160; 331/94.5

[56] References Cited
UNITED STATES PATENTS
3,500,237  3/1970  Myers et al. .................. 331/94.5
3,445,826  5/1969  Myers ............................ 331/94.5 X
3,466,110  9/1969  Pole et al. ..................... 350/3.5
3,243,722  3/1966  Billings ......................... 331/94.5
3,392,353  7/1968  Miller ........................... 350/160 X
3,339,151  8/1967  Smith ............................ 350/160 X
3,262,058  7/1966  Ballman et al. ................ 250/199 X
3,423,686  1/1969  Ballman et al. ................ 350/160 X
3,395,960  8/1968  Chang et al. .................. 350/160 X
3,396,305  8/1968  Buddeche et al. ............. 315/12

OTHER REFERENCES
R. Pole et al., Reactive Processing of Phase Objects, Applied Physics Letters, Vol. 8, No. 9, 5/1/66

Primary Examiner—Ronald L. Wibert
Assistant Examiner—T. Major
Attorneys—Hanifin and Jancin and John J. Goodwin ABSTRACT: An electro-optic crystal sealed in a cathode-ray tube disposed between the end mirrors of a flat-field focusing laser cavity operates, when scanned by the modulated electron beam to vary the index of refraction of the crystal, to cause it to function as a controllable phase-modulating transducer in an optical system. The phase modulation distributes light into zero and side order beams. The cavity is so designed that it causes the side order light to escape from it, forming an intensity modulated image on a viewing screen in the manner of projection television, while the zero order light is reflected within the cavity to sustain the lasing action.

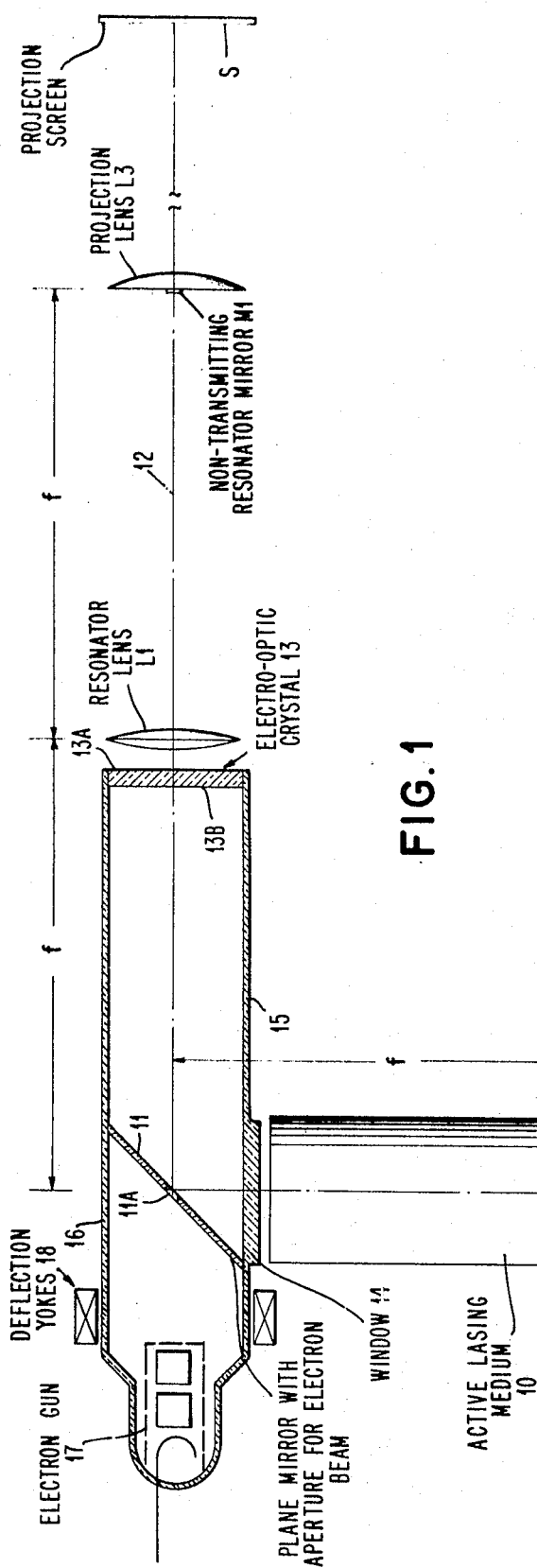
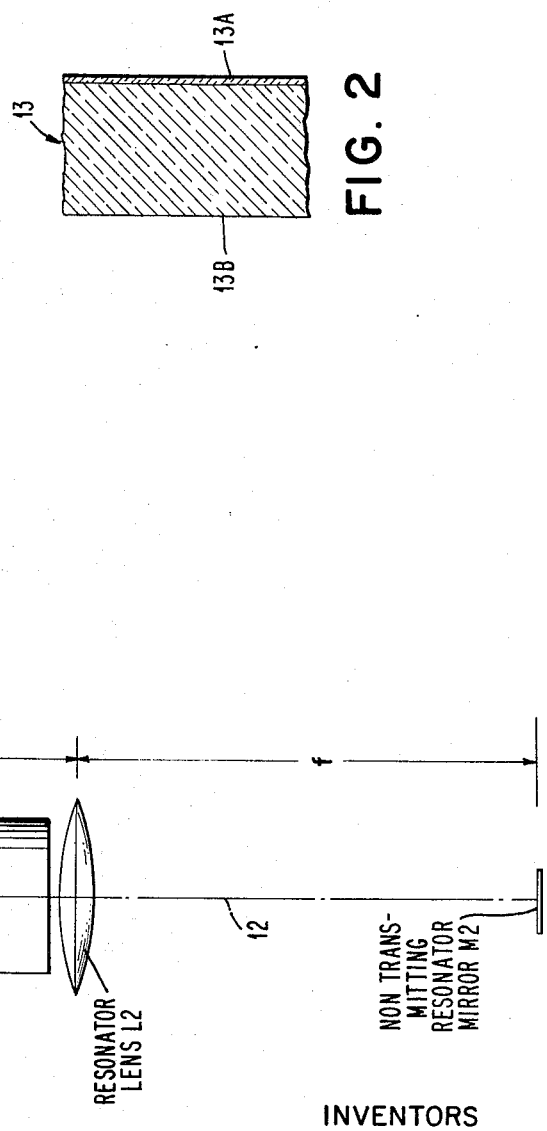

IMAGE DISPLAY APPARATUS

This is a continuation of Ser. No. 668,558 filed Sept. 18, 1967, now abandoned.

BACKGROUND OF THE INVENTION

1. Field of Invention

This invention relates to an image production apparatus wherein an electro-optic crystal is enclosed within a flat-field laser cavity to provide a phase-modulating transducer whose index of refraction may be selectively spatially controllable to provide an intensity modulated image of the controlling signal.

2. Description of the Prior Art

The phase contrast method of observation of a phase-modulating transducer is discussed by Born and Wolf beginning at page 423 in "Principles of Optics," Pergammon Press (1959). In that dissertation, the phase transducer was immutable and incorporated into an optical system such that the phase modulation produced an intensity modulated image that was visible.

The copending application of R. V. Pole et al., Ser. No. 537,147, filed Mar. 24, 1966, having a common ownership with the instant application, discloses an apparatus for producing an intensity modulated image from a phase-modulating transducer by disposing the phase-modulating transducer in a flat-field laser cavity. In this prior application, the phase-modulating transducer was fixed and, therefore, was incapable of producing other than a fixed display.

SUMMARY OF THE INVENTION

The instant invention expands the capabilities of the foregoing Pole et al. apparatus by constructing the phase-modulating transducer of an electro-optic crystal and enclosing it within the envelope of a cathode-ray tube so that the electron beam thereof may scan the crystal to selectively spatially modulate its index of refraction to produce a variable phase-modulating transducer disposed in an optical resonant cavity to produce an intensity modulated image of the variable object.

It is therefore an object of this invention to dispose an electro-optic crystal in a flat-field resonant laser cavity, to modulate the index of refraction of the crystal in accordance with the intensity distribution of an object whose image is to be projected and to provide optical elements so disposed with respect to that object for creating the image.

The foregoing and other objects, features and advantages of the invention will be apparent from the following more particular description of a preferred embodiment of the invention, as illustrated in the accompanying drawing.

BRIEF DESCRIPTION OF THE DRAWING

In the drawing:

FIG. 1 is a section drawing which shows the relative disposition of the elements of the invention.

FIG. 2 is a section drawing showing in more detail the construction of the crystal used in the apparatus of FIG. 1.

DESCRIPTION OF THE PREFERRED EMBODIMENT

In FIG. 1 the basic flat-field laser is structured by the mirrors M1 and M2, by the lenses L1 and L2, and by the active lasing medium 10, preferably but not necessarily a gas lasing element. Because of the need for electron beam modulation of the electro-optic crystal 13, the laser cavity as a matter of structural convenience is bent 90° by the addition of the mirror 11. The laser cavity, except for this bend, is otherwise conventional. Thus, when the active lasing medium 10 is suitably pumped to provide the requisite inverted population within the active medium 10, the mirrors M1 and M2 set up the oscillations along the rectilinear path between the mirrors to establish the stimulated emission. Characteristically, the mirrors M1 and M2 are disposed a focal length away from their respective lenses L1 and L2 which, in turn, are separated by the sums of the focal lengths of the two lenses L1 and L2. Since with this relative disposition of the cavity elements all of the stimulated emission (in the absence of any modulation of the crystal) is focused to a point on the terminal mirrors M1 and M2, these mirrors may be made very small, and in fact are very small. As an alternative to the mirror arrangement shown in FIG. 1, if it is desired to use a high-power laser, the mirrors M1 and M2 could each be moved slightly beyond the focus and be spherical in shape, with the center of curvature at the foci.

Disposed between the lenses L1 and L2 is the phase-modulating crystal 13, which in the absence of any modulant produces no effect upon the lasing action, adjustment having been suitably made for the quiescent index of refraction of the crystalline material in adjusting the cavity of resonance. A similar adjustment is made for the alteration in the effective optical path length of the cavity by the window 14. This is a matter of initial adjustment, and once made requires no further adjustment. The phase object 13 is fabricated from one of the class of materials possessing the property of change of index of refraction along one of its crystalline axis under influence of an electric field. The crystal 13 is preferably constructed from lithium niobate ($LiNbO_3$) or lithium tantalate ($LiTaO_3$). It is also possible to use KDP (potassium dihydrogen phosphate, $KH_2PO_4$) and ADP (ammonium dihydrogen phosphate). If lithium niobate is used, the crystal is cut perpendicular to its C axis and is ground and its optically flat surfaces are disposed normal to the axis of the cavity. Referring to FIG. 2, it is seen that upon the surface 13A is deposited an electrically conductive but transparent coating. This provides the requisite potential level for this surface so that a charge may be deposited on the opposite surface 13B by the electron beam. The surface 13B may be left uncoated or provided with a transparent protective layer, such as silicon oxide, merely to protect it from the electron beam.

To provide the requisite spatial modulation of the index of refraction of the crystal 13, it is sealed in the end of the envelope 15 of a cathode-ray tube 16, of which the window 14 is also an integral part, as shown in FIG. 1. The envelope 15 (including crystal 13 and window 14) encloses the mirror 11 and the conventional electron gun structure 17. This gun structure 17 produces a focused beam of electrons which passes through an aperture 11A in the mirror 11 and impinges on the surface 13B of the crystal 13. Deflection yokes 18 provide the deflection for the electron beam, while the grid, standard in the electron gun, provides the intensity modulation for the beam, so that a charge pattern may be impressed on the surface 13B of crystal 13 in accordance with the light intensity distribution of the desired image. The projection system may thus operate compatibly with the standard raster scan mode of commercial television.

As the resonator oscillates in a single, or a number of modes, the charges deposited on the surface 13B of the crystal will cause local charges in the index of refraction of the crystal in accordance with the modulation and animation of the electron beam. The crystal 13 thus becomes a phase-modulating transducer when it is scanned by the electron beam. The laser action which would normally occur between the mirrors M1 and M2 in the absence of modulation of crystal 13 will, in the presence of modulation, produce variable refraction in accordance with the localized changes in the index of refraction so that the side orders will be coupled out of the cavity (escaping mirror M1) while the mirror will return the zero order light to the cavity to sustain the lasing action. The mirror M1, in blocking the zero order light, changes the phase-modulated light into "area" modulated light which is seen by the eye as an "intensity" modulated image.

So that the phase-modulating transducer, which is normally invisible to the human eye, may be converted to a visible intensity modulated image the additional lens L3 is provided which projects an intensity-modulated image upon the screen S in accordance with the scanned charge pattern deposited by the electron beam upon the crystal 13. The mirror M1 is conveniently deposited upon the surface of the lens L3 by depositing a highly reflecting surface on a small incremental area thereof on the optical axis 12.

A feature obtained with the use of the lithium niobate crystal is that the charge image can be retained on the crystal for a selected duration of time in accordance with environmental temperature, that is, the time constant varies with temperature. At 1,200° C. the charge is retained for microseconds whereas at 400° C. the charge is retained for hours. By proper temperature control, the charge image can be retained on the crystal for a duration compatible with the duration of one of the conventional television frames when it is desired to project television signals. Since the zero order energy is returned within the cavity, it is not necessary to achieve deep-phase modulation of the crystal.

Another feature which may be included but which is not shown in FIG. 1 is that selective erasure may be combined with long persistance by operating the crystal at room temperature and erasing the charge with a flood beam from an appropriate potential.

With the crystal 13 in the quiescent state (absence of electron beam modulation), it will have a uniform index of refraction throughout the crystal and there will be no selective retardation of the light passing therethrough. All light will thus arrive in phase at lens L1 and will be focused thereby upon the mirror M1 for reflection and return to the cavity to sustain the lasing action. When, however, the electron beam impinges on the crystal to change its index of refraction, the rays that would normally be refracted to focus on the mirror will be shifted in phase in accordance with the localized changes in the index of refraction of the crystal. These rays will no longer focus on the mirror but will bypass the mirror M1 to be projected on the screen S by the lens L3 to form a visible intensity modulated image thereon.

Modifications to the embodiment of FIG. 1 within the state of the art are possible thus, while a Schlieren type of display is shown, the well-known phase contrast method may be employed. The phase contrast method of display is described in the article by F. Zernike, Physica IX, No. 7, July 1942, pages 686 and 974. Also, if a larger spherical mirror is used as mirror M2, the lenses L1 and L2 could be eliminated.

While the invention has been particularly shown and described with reference to a preferred embodiment thereof, it will be understood by those skilled in the art that various changes in form and details may be made therein without departing from the spirit and scope of the invention.

What is claimed is:

1. An image display apparatus comprising a laser cavity having an axis of symmetry and including an active laser medium for stimulated emission of light within said cavity and a first and second nontransmissive mirror respectively arranged perpendicular to said axis of symmetry at the ends of the cavity, said cavity and axis of symmetry being angular and said cavity further including a third mirror located at the apex of the angle of said axis of symmetry for reflecting said light between said first and second mirrors said third mirror having an aperture therein, A phase-modulating electro-optic crystal located within said cavity between said first and second mirrors in the path of said light and having its surface perpendicular to said axis of symmetry, means external to said cavity for varying the index of refraction of said crystal for phase modulating said light, said means including an electron gun positioned for scanning said crystal with a beam of electrons projected through said aperture normally to the surface of said crystal for varying the index of refraction of said crystal in spatially oriented incremental areas in accordance with the spatial distribution of intensity of any image to be coupled out of said cavity, wherein said varying of said index of refraction modulates said light into a zero order light beam and higher side order light beams, said first nontransmissive mirror being located in the path of said zero order light beam for reflecting said zero order beam back into said cavity and allowing said side order beams to pass out of said cavity.

2. An image display apparatus according to claim 1 including means for applying a modulation signal to said electron gun for intensity modulating said electron beam in accordance with the image to be coupled out of said cavity.

3. An image display apparatus according to claim 1 further including a projection lens in the path of said side order beams passed out of said cavity for collecting said side order beams; and a display screen proximate to said projection lens for displaying said intensity modulated image.

* * * * *